United States Patent
Kim et al.

(10) Patent No.: US 8,752,860 B2
(45) Date of Patent: Jun. 17, 2014

(54) EXTERNAL AIR BAG FOR VEHICLE

(75) Inventors: Yong Sun Kim, Namyangju-si (KR); Un Koo Lee, Seoul (KR); Seoung Hoon Lee, Suwon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 201 days.

(21) Appl. No.: 13/316,535

(22) Filed: Dec. 11, 2011

(65) Prior Publication Data

US 2012/0319387 A1 Dec. 20, 2012

(30) Foreign Application Priority Data

Jun. 17, 2011 (KR) ........................ 10-2011-0058925

(51) Int. Cl.
*B60R 21/16* (2006.01)
(52) U.S. Cl.
USPC .................... 280/728.2; 280/728.3; 280/730.1
(58) Field of Classification Search
USPC ........................ 280/728.1, 728.2, 728.3, 730.1
See application file for complete search history.

(56) References Cited

U.S. PATENT DOCUMENTS

| | | | | |
|---|---|---|---|---|
| 3,708,194 A * | 1/1973 | Amit | ................. | 293/1 |
| 5,959,552 A * | 9/1999 | Cho | ............... | 340/903 |
| 6,637,788 B1 * | 10/2003 | Zollner et al. | ................ | 293/107 |
| 7,073,619 B2 * | 7/2006 | Alexander et al. | ............ | 180/274 |
| 7,150,495 B2 * | 12/2006 | Fayt et al. | ................ | 296/187.02 |
| 7,174,985 B2 * | 2/2007 | Sawa et al. | ..................... | 180/274 |
| 7,347,464 B2 * | 3/2008 | Tanabe | ................ | 293/4 |
| 7,784,817 B2 * | 8/2010 | Choi et al. | ................ | 280/728.2 |
| 8,408,350 B2 * | 4/2013 | Wilmot et al. | ................ | 180/274 |
| 2005/0269805 A1 * | 12/2005 | Kalliske et al. | ............ | 280/730.1 |
| 2006/0185923 A1 * | 8/2006 | Tanabe | .......................... | 180/274 |
| 2009/0050395 A1 * | 2/2009 | Hosokawa et al. | ........... | 180/274 |
| 2009/0102167 A1 * | 4/2009 | Kitte et al. | ................. | 280/728.2 |

* cited by examiner

*Primary Examiner* — Toan To
(74) *Attorney, Agent, or Firm* — Morgan, Lewis & Bockius LLP

(57) ABSTRACT

An external air bag apparatus may include a bumper cover having a tear line in a front portion thereof, a cushion disposed behind the bumper cover, wherein the cushion expands outwards by tearing the tear line when the cushion may be expanded so that the cushion surrounds a front surface of the bumper cover, and an expansion guide arranged between the bumper cover and the cushion to guide the cushion to expand forwards to the bumper cover.

11 Claims, 5 Drawing Sheets

EXTERNAL AIR BAG FOR VEHICLE

CROSS-REFERENCE TO RELATED APPLICATIONS

The present application claims priority to Korean Patent Application No. 10-2011-0058925 filed on Jun. 17, 2011, the entire contents of which is incorporated herein for purposes by this reference.

BACKGROUND OF THE INVENTION

1. Field of the Invention

The present invention relates to an external air bag that is disposed in the front part of a vehicle to be expanded before a collision of a vehicle body with a front obstacle, thereby absorbing collision energy.

2. Description of Related Art

Up to the present, expansion of vehicle air bags has been focused to air bags that are disposed inside vehicles (hereinafter, referred to as "internal air bags") in order to generally decrease the degree of injury to occupants when the occupants collide with a vehicle body or rigid interior parts. Examples include a driver's side air bag, an air bag in a seat next to the driver, a curtain air bag, a seat side air bag, and the like.

Recently, the approaches that are becoming popular are intended to decrease an impact to a vehicle itself when the vehicle collides with an obstacle.

One of them is an external air bag, which is disposed behind a bumper in a space between the bumper and a vehicle body in order to expand forwards before the vehicle body collides with an obstacle, thereby absorbing and decreasing the impact.

However, up to the present, particular techniques regarding a structure for mounting an external air bag are unsatisfactory. In addition, packages in which the external air bag is mass produced and mounted on vehicles have not been taken under consideration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an external air bag for a vehicle, in which a cushion can easily expand along an expansion guide when the external air bag is expanded.

The present invention is also intended to provide an external air bag for a vehicle, which has a mounting structure in which the expansion guide is fixed to a bumper cover.

According to one aspect of the present invention, an external air bag apparatus may include a bumper cover having a tear line in a front portion thereof, a cushion disposed behind the bumper cover, wherein the cushion expands outwards by tearing the tear line when the cushion is expanded so that the cushion surrounds a front surface of the bumper cover, and an expansion guide arranged between the bumper cover and the cushion to guide the cushion to expand forwards to the bumper cover.

The expansion guide may include an upper expansion plate, a lower expansion plate, and a side expansion plate, the side expansion plate connecting the upper expansion plate to the lower expansion plate, wherein the cushion is disposed therebetween.

A front portion of the expansion guide is open, wherein a rear portion of the expansion guide is open.

A front portion of the expansion guide extends at an incline towards the bumper cover.

At least one rib is provided around the expansion guide, the rib reinforcing rigidity of the expansion guide.

The external air bag apparatus may further include a door provided in a front portion of the expansion guide, wherein a first portion of the door is pivotally connected to the expansion guide via a pivoting hinge, and wherein a second portion of the door is connected to the expansion guide via a fixing member so that the second portion of the door is separable from the expansion guide when the cushion is expanded.

The fixing member may include one of a magnet and a Velcro device.

The external air bag apparatus may further include a front cover connecting the upper expansion plate to the lower expansion plate to cover a front surface of the expansion guide, wherein the front cover may have a tear line in peripheral portions thereof, wherein the tear line may include a continuous tear line extending along an a upper periphery of the front cover, and a discontinuous tear line extending along a lower periphery of the front cover.

The front cover may have a plurality of holes.

The external air bag apparatus may include a first bracket disposed inside the bumper cover and attached thereto, a second bracket disposed outside the expansion guide and attached thereto, and a fastener fastening the first bracket to the second bracket such that the expansion guide is fixed to the bumper cover.

According to embodiments of the present invention, in the external air bag for a vehicle, the cushion is reliably expanded along the expansion guide.

In addition, in the external air bag for a vehicle according to embodiments of the present invention, the expansion guide has a mounting structure that is fixed to the inner portion of the bumper cover, and thus has improved assemblability in a production line.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
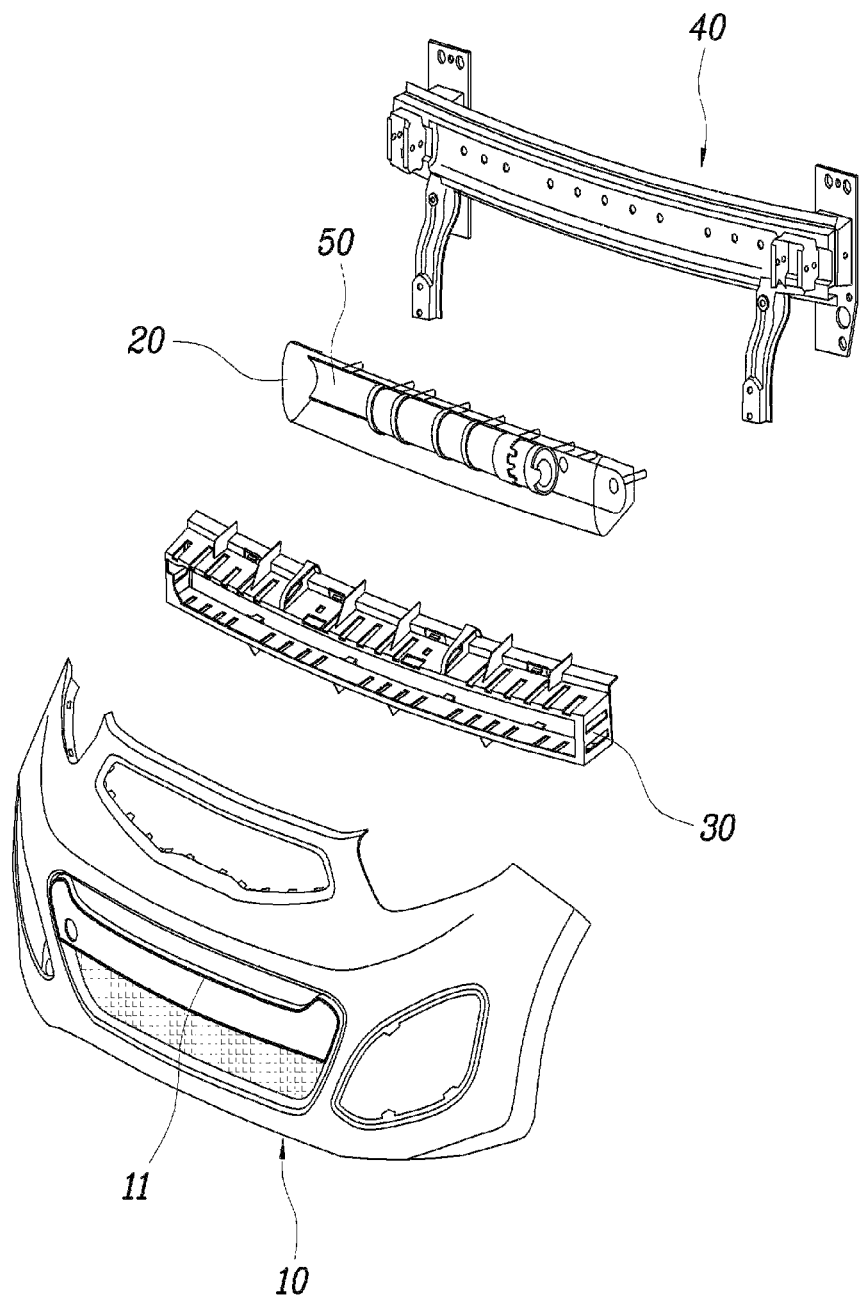
FIG. 1 is a perspective view showing an external air bag for a vehicle according to one embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to preferred embodiments of an external air bag for a vehicle according to the present invention, examples of which are illustrated in the accompanying drawings. Wherever possible, the same reference numerals will be used throughout the drawings and the description to refer to the same or like parts.

Figure 2:
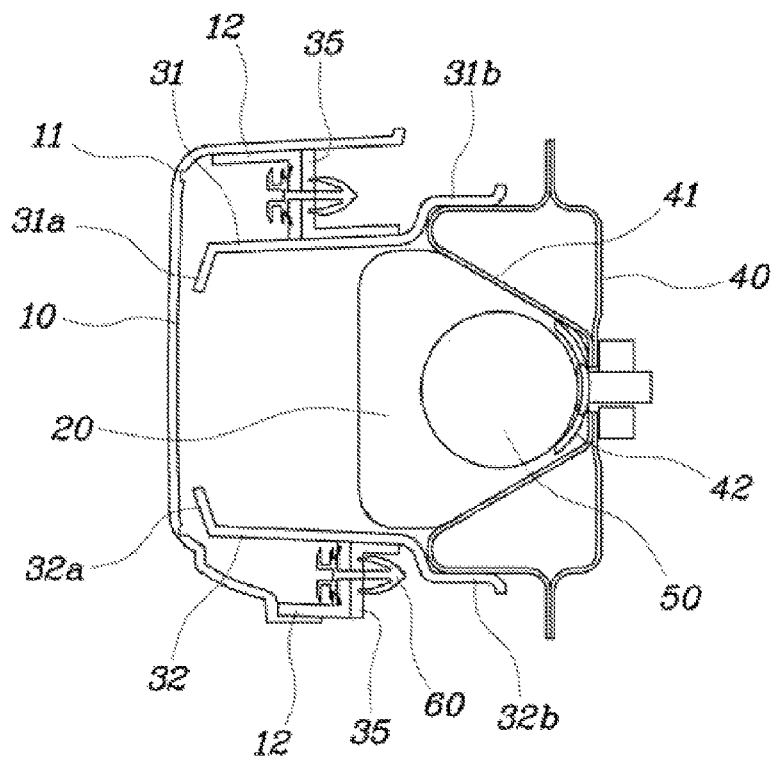
FIG. 2 is a cross-sectional view showing the external air bag for a vehicle according to one embodiment of the present invention.
Figure 3:
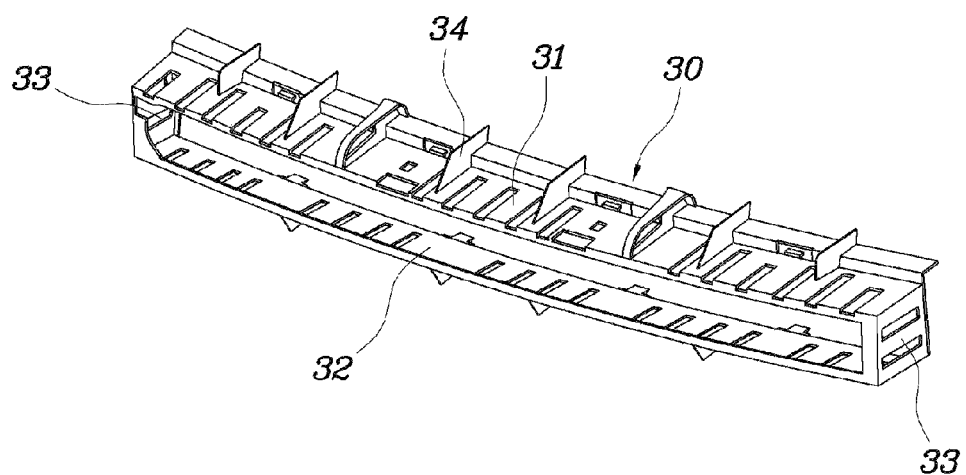
FIG. 3 is a perspective view showing the expansion guide of the external air bag for a vehicle according to one embodiment of the present invention.

FIG. 1 is a perspective view showing an external air bag for a vehicle according to one embodiment of the present invention, FIG. 2 is a cross-sectional view showing the external air bag for a vehicle according to one embodiment of the present invention, and FIG. 3 is a perspective view showing the expansion guide of the external air bag for a vehicle according to one embodiment of the present invention.

Referring to FIGS. 1 to 3, the external air bag for a vehicle according to one embodiment of the present invention includes a bumper cover 10 having a tear line 11 in the front portion thereof and a cushion 20 disposed behind the bumper cover 10. The cushion 20 can expand outwards by tearing the tear line 11 to surround the front part of the bumper cover 10 when it expands. The external air bag also includes the expansion guide 30 that is arranged between the bumper cover 10 and the cushion 20 to guide the cushion 20 to expand forwards.

A recess 41 is provided in the front portion of a bag beam 40, and an inflator 50, which provides gas pressure to expand the cushion 20, is disposed together with the cushion 20 in the recess 41 of the bag beam 40. In addition, a bracket 42, which supports the cushion 20 from behind, is disposed in the central portion of the recess 41.

The expansion guide 30 includes an upper expansion plate 31, a lower expansion plate 32, and a side expansion plate 33, which connects the upper expansion plate 31 to the lower expansion plate 32. Both the front and rear surfaces of the expansion guide 30 are open.

A first end 31a is formed in the left end portion of the upper expansion plate 31, extending at an incline toward the bumper cover 10. A first bend 31b is formed in the right end portion of the upper expansion plate 31, and is bent along the upper portion of the bag beam 40 such that the first bend 31b is supported on the upper portion of the bag beam 40. In addition, the lower expansion plate 32 also has a second end 32a and a second bend 32b that are configured to be vertically symmetrical with those of the upper expansion plate 31.

Since both the front and rear surfaces of the expansion guide 30 are open, the intrinsic rigidity of the expansion guide 30 is weak. Accordingly, ribs 34 are provided on the upper surface of the upper expansion plate 31 and the underside surface of the lower expansion plate 32 in order to reinforce the rigidity of the expansion guide 30.

In order to fix the expansion guide 30 between the bumper cover 10 and the cushion 20, first brackets 12 are provided in the upper and lower portions inside the bumper cover 10, the first brackets 12 each having a hole and being bent. Also in the upper and lower portions of the expansion guide 30, second brackets 35 are provided, such that the second brackets 35 have a hole and are bent to correspond to the first brackets 12. Each hole of the first brackets 12 is fastened to a corresponding hole of the second brackets 35 using a fastener 60, such that the expansion guide 30 is fixed to the inside of the bumper cover 10.

As set forth above, the external air bag for a vehicle of this embodiment is configured such that the expansion guide 30 is disposed between the bumper cover 10 and the cushion 20. Consequently, when the cushion 20 expands, the cushion 20 is guided forwards so that it efficiently can exit the bumper cover 10 by tearing the tear line 11 of the bumper cover 10, thereby performing a shock absorbing function.

Figure 4:
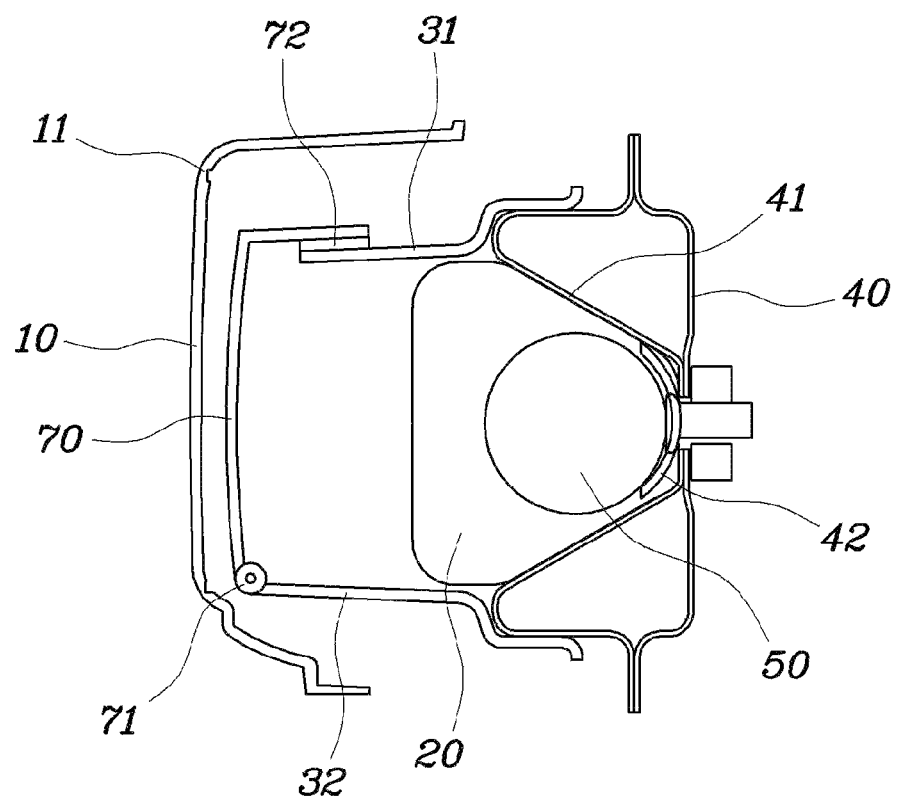
FIG. 4 is a cross-sectional view showing an external air bag for a vehicle according to one modified embodiment of the present invention.
Figure 5:
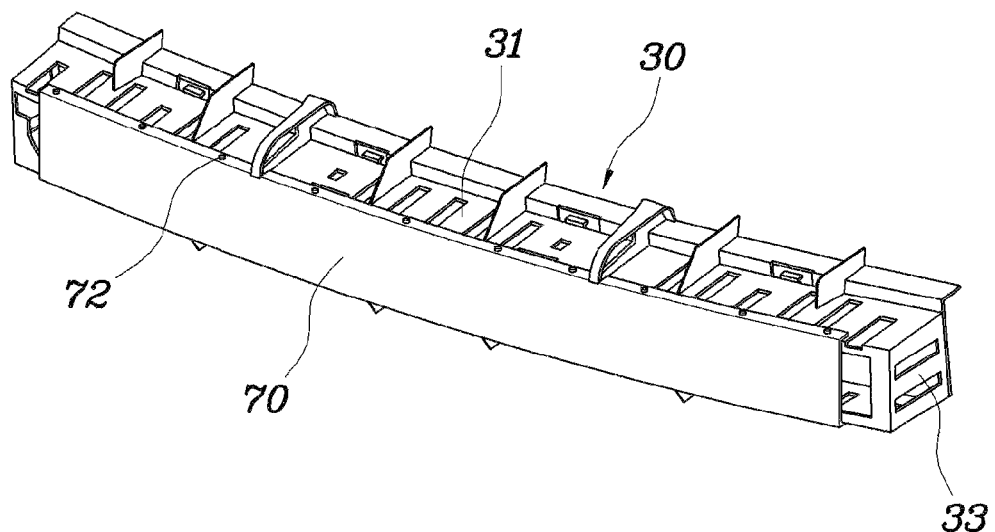
FIG. 5 is a perspective view showing the expansion guide of the external air bag for a vehicle according to one modified embodiment of the present invention.

FIG. 4 is a cross-sectional view showing an external air bag for a vehicle according to one modified embodiment of the present invention, and FIG. 5 is a perspective view showing the expansion guide of the external air bag for a vehicle according to one modified embodiment of the present invention.

Referring to FIG. 4 and FIG. 5, in the external air bag for a vehicle according to one modified embodiment of the present invention, the expansion guide 30 includes an upper expansion plate 31, a lower expansion plate 32, and a side expansion plate 33, which connects the upper expansion plate 31 to the lower expansion plate 32. A door 70 is disposed in the front part of the expansion guide 30, and the rear surface of the expansion guide 30 is open.

The lower portion of the door 70 is connected to the lower expansion plate 32 of the expansion guide 30 using a pivoting hinge 71, and the upper portion of the door 70 is connected to the upper expansion plate 31 of the expansion guide 30 using a fixing member 72 that can be separated from the expansion guide 30 when the cushion 20 expands. Here, the fixing member 72 can be implemented using one of a magnet and a Velcro device.

When the cushion 20 expands, it expands forwards along the expansion guide 30. Due to resultant pressure, the upper portion of the door 70 is separated from the upper expansion plate 31 of the expansion guide 30, and then starts rotating forwards.

When the door 70 has completely rotated under the bumper cover 10 while tearing the tear line 11 by pressing the rear surface of the bumper cover 10, the cushion 20 exits outside and then expands further.

Figure 6:
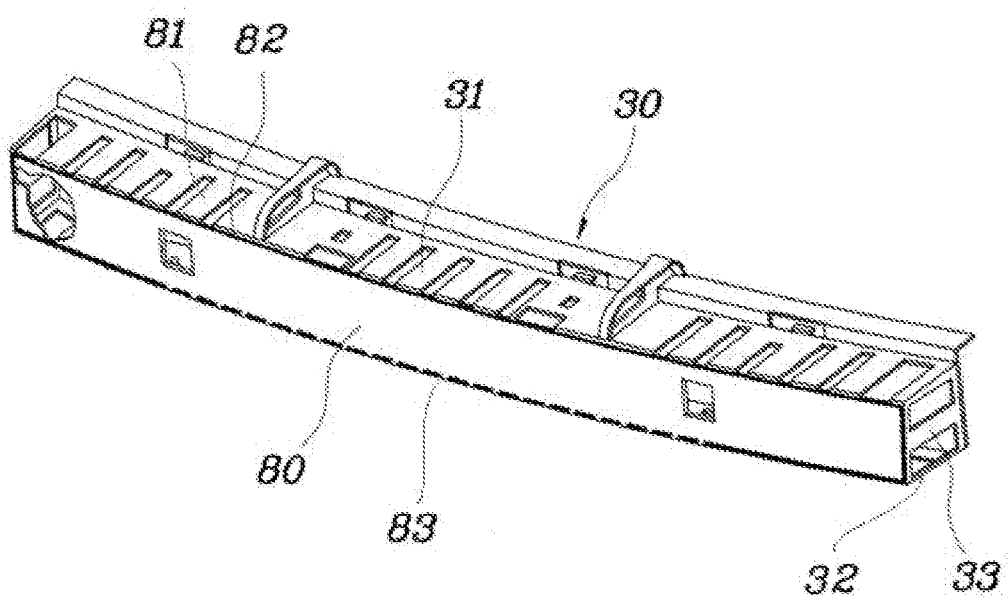
FIG. 6 is a cross-sectional view showing an external air bag for a vehicle according to another modified embodiment of the present invention.
Figure 7:
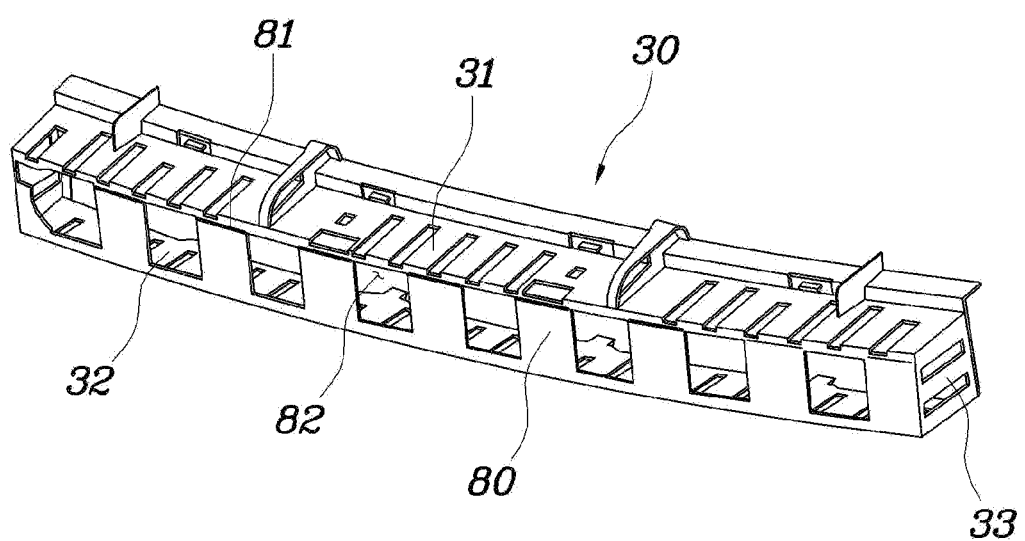
FIG. 7 is a perspective view showing the expansion guide of the external air bag for a vehicle according to another modified embodiment of the present invention.

FIG. 6 is a cross-sectional view showing an external air bag for a vehicle according to another modified embodiment of the present invention, and FIG. 7 is a perspective view showing the expansion guide of the external air bag for a vehicle according to another modified embodiment of the present invention.

Referring to FIG. 6, the expansion guide 30 according to another modified embodiment of the present invention includes an upper expansion plate 31, a lower expansion plate 32, and a side expansion plate 33, which connects the upper expansion plate 31 to the lower expansion plate 32. A front cover 80 is provided on the front surface of the expansion guide 30, and covers the front surface by connecting the expansion plate 31 to the expansion plate 32. The rear surface of the expansion guide 30 is open.

A tear line 81 is formed in the front cover 80. The tear line 81 includes a continuous tear line 82, which extends along the upper periphery, the side peripheries and right and left portions of the lower periphery of the front cover 80, and a discontinuous tear line 83, which extends along the center portion of the lower periphery of the front cover 80.

When the cushion 20 expands, it expands forwards along the expansion guide 30, and the tear line 81 is accordingly torn under the pressure of the expansion. Consequently, the front cover 80 is rotated forwards about the portion in the lower periphery of the front cover 80 in which the tear line extends discontinuously.

When the front cover 80 has completely rotated under the bumper cover 10 while tearing the tear line 11 by pressing the rear surface of the bumper cover 10, the cushion 20 exits outside and then expands further.

In according to another exemplary embodiment of the present invention as shown in FIG. 7, a plurality of holes 82 is formed in the front cover 80, such that the tear line 81 of the front cover 80 can be easily torn when the cushion 20 is expanded, thereby decreasing the length in which the tear line 81 is formed.

Here, the tear line 81 of the front cover 80 is formed only in the upper periphery, so that the front cover 80 can rotate forwards about the lower portion in which the tear line 81 is not formed when the cushion 20 is expanded.

Although the exemplary embodiments of the present invention have been described for illustrative purposes, those skilled in the art will appreciate that various modifications, additions and substitutions are possible, without departing from the scope and spirit of the invention as disclosed in the accompanying claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An external air bag apparatus comprising:
   a bumper cover having a tear line in a front portion thereof;
   a cushion disposed behind the bumper cover, wherein the cushion expands outwards by tearing the tear line when the cushion is expanded so that the cushion surrounds a front surface of the bumper cover; and
   an expansion guide arranged between the bumper cover and the cushion to guide the cushion to expand forwards to the bumper cover;
   wherein the expansion guide includes an upper expansion plate, a lower expansion plate, and a side expansion plate, the side expansion plate connecting the upper expansion plate to the lower expansion plate; and
   wherein the cushion is disposed therebetween.

2. The external air bag apparatus of claim 1, wherein a front portion of the expansion guide is open.

3. The external air bag apparatus of claim 2, wherein a rear portion of the expansion guide is open.

4. The external air bag apparatus of claim 1, wherein a front portion of the expansion guide extends at an incline towards the bumper cover.

5. The external air bag apparatus of claim 1, wherein at least one rib is provided around the expansion guide, the rib reinforcing rigidity of the expansion guide.

6. The external air bag apparatus of claim 1, further including:
   a door provided in a front portion of the expansion guide,
   wherein a first portion of the door is pivotally connected to the expansion guide via a pivoting hinge, and
   wherein a second portion of the door is connected to the expansion guide via a fixing member so that the second portion of the door is separable from the expansion guide when the cushion is expanded.

7. The external air bag apparatus of claim 6, wherein the fixing member includes one of a magnet and a Velcro device.

8. The external air bag apparatus of claim 1, further including:
   a front cover connecting the upper expansion plate to the lower expansion plate to cover a front surface of the expansion guide,
   wherein the front cover has a tear line in peripheral portions thereof.

9. The external air bag apparatus of claim 8, wherein the tear line includes:
   a continuous tear line extending along an a upper periphery of the front cover; and
   a discontinuous tear line extending along a lower periphery of the front cover.

10. The external air bag apparatus of claim 8, wherein the front cover has a plurality of holes.

11. An external air bag apparatus comprising:
    a bumper cover having a tear line in a front portion thereof;
    a cushion disposed behind the bumper cover, wherein the cushion expands outwards by tearing the tear line when the cushion is expanded so that the cushion surrounds a front surface of the bumper cover;
    an expansion guide arranged between the bumper cover and the cushion to guide the cushion to expand forwards to the bumper cover;
    a first bracket disposed inside the bumper cover and attached thereto;
    a second bracket disposed outside the expansion guide and attached thereto; and
    a fastener fastening the first bracket to the second bracket such that the expansion guide is fixed to the bumper cover.

* * * * *